W. BARBER.
Machine for Sawing Staves.

No. 163,350. Patented May 18, 1875.

Witnesses:
A. Bennerkendorf
C. Sedgwick

Inventor:
W. Barber
Per Munn & Co.
Attorneys.

UNITED STATES PATENT OFFICE.

WILLIAM BARBER, OF CAPE VINCENT, ASSIGNOR TO HIMSELF AND LEWIS PARKER, OF LYME, NEW YORK.

IMPROVEMENT IN MACHINES FOR SAWING STAVES.

Specification forming part of Letters Patent No. 163,350, dated May 18, 1875; application filed September 27, 1873.

*To all whom it may concern:*

Be it known that I, WILLIAM BARBER, of Cape Vincent, in the county of Jefferson and State of New York, have invented a new and useful Improvement in Machines for Sawing Staves, of which the following is a specification:

The invention will first be fully described and then pointed out in the claims.

Figure 1:
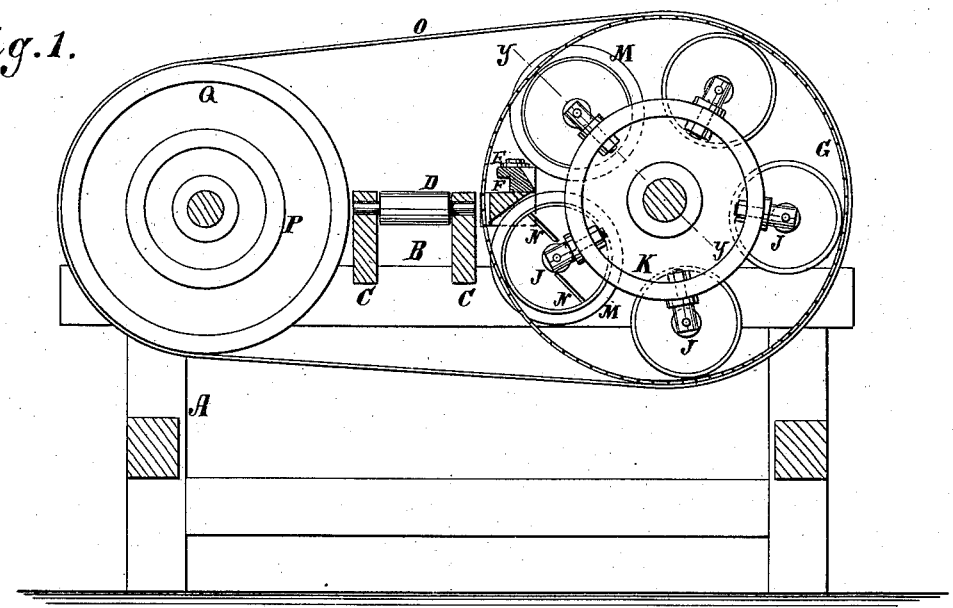
Figure 3:
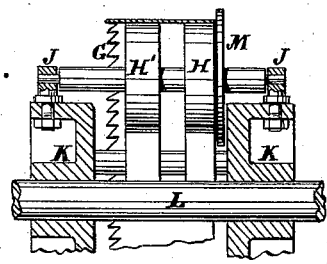
Figure 2:
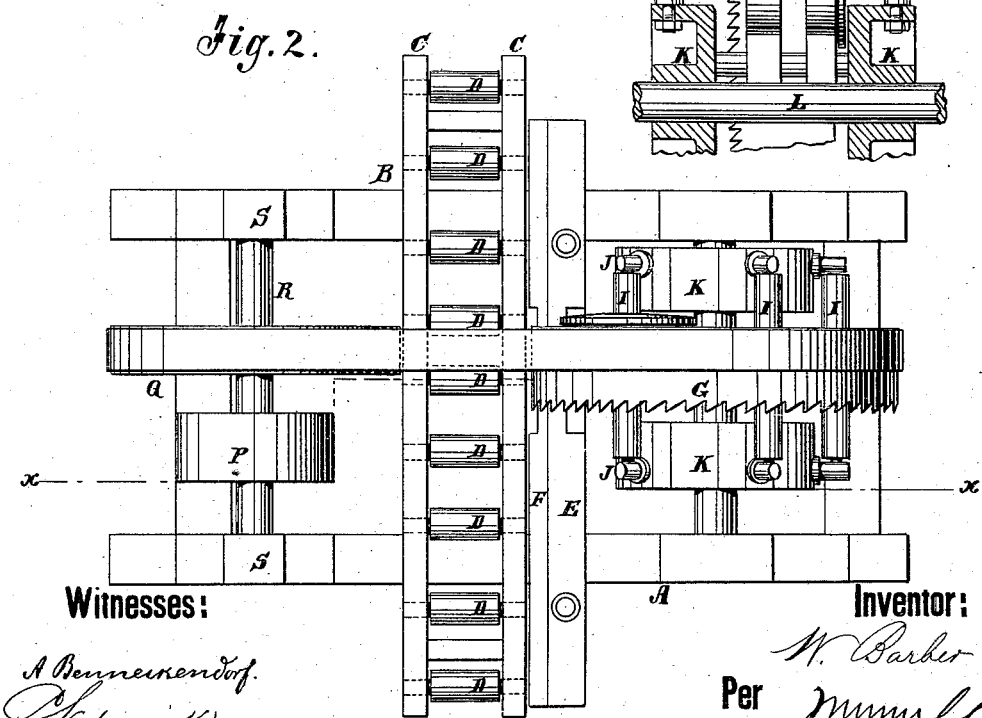

In the accompanying drawing, Figure 1 is a vertical section of Fig. 2, taken on the line $x$ $x$. Fig. 2 is a top or plan view. Fig. 3 is a section of Fig. 1 taken on the line $y$ $y$.

Similar letters of reference indicate corresponding parts.

A is a frame of rectangular form, of suitable size and strength, on which the working parts of the machine are supported. B is the bed or carriage way on which the timber to be sawed is laid, consisting of two stringers, C C, with cross-rollers D. E is the adjustable guide or gage, by which the thickness of the stave or other article sawed is regulated. This guide is, preferably, made with a projecting lip, F, so that the bearing will be in about the middle of the piece sawed. G represents a cylinder saw of any diameter and width, which is revolved on a series of rollers, H H'. I represents the arbors of these rollers. Each roller is, preferably, made in two parts, H and H', the latter of which is adjustable on the arbor to suit the width of the saw. The arbors revolve on pivots in their ends supported in the stands J, which stands are adjustable in the flanged heads K K, as seen in Fig. 1, so as to suitably support the saw. The heads K are stationary and supported by a bar, L. One or more of the rollers H are flanged, as seen at M, to receive the thrust and keep the saw in position. N N represent wings on the side of the roller H', by means of which a current of air is produced for expelling the sawdust.

I do not confine myself to this particular mode of disposing of the sawdust, and keeping it from the rollers, as it may be done in any effective manner.

The cylinder saw, thus arranged on the guiding-rollers, is revolved by means of a belt, O, on the saw itself. P is the driving-pulley. Q is the belt-pulley. These pulleys are on the shaft R, which runs in the boxes S S on the top of the frame A.

Cylinder saws, I am aware, are not new, but they have hitherto been connected with a central shaft by means of a head, and the length of the stave or stuff sawed is limited by the width of the saw. For sawing hogshead staves, or moldings, and for similar purposes, such saws are useless.

With a cylinder saw arranged and operated according to my invention, staves of any length may be sawed, as well as moldings and other stuff for joiner, cabinet work, or other purposes.

With the ordinary cylinder saw, the piece sawed off has to be drawn back at each cut, but with mine the stuff sawed off is pushed through the same as when sawed by the common circular saw.

I do not confine myself to the precise form and arrangement shown, as variations may be made without departing from my invention.

Having thus described my invention, I claim as new and desire to secure by Letters Patent—

1. The combination, with cylinder saw G, of cross-rolls D, lip-guides E F, and rollers H, all arranged on a frame, substantially as and for the purpose described.

2. The rollers H', provided with wings N, applied substantially as and for the purpose specified.

WILLIAM BARBER.

Witnesses:
 E. D. HILTS,
 THOMAS TARBELL.